Patented Aug. 24, 1943

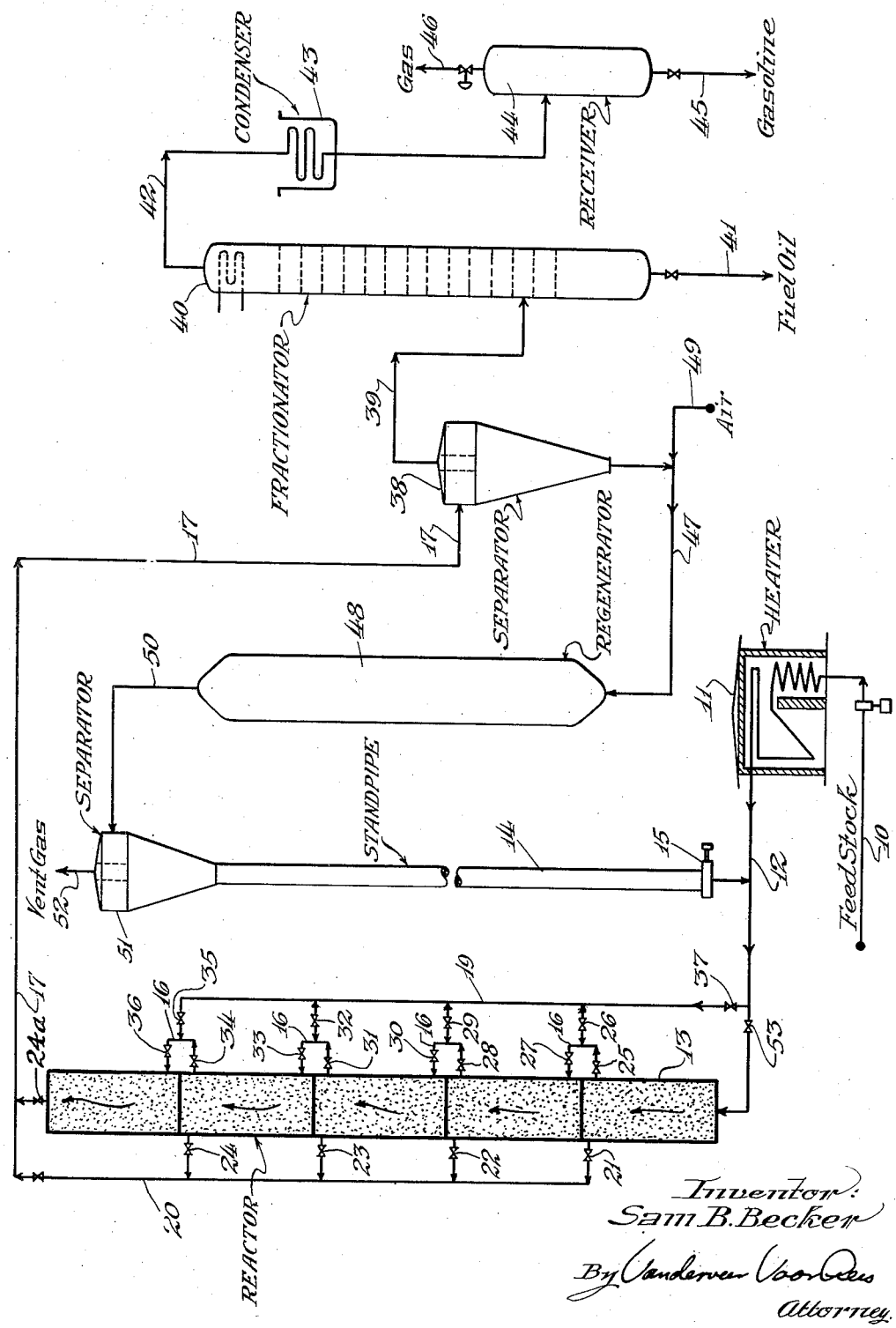

2,327,489

UNITED STATES PATENT OFFICE 2,327,489

CATALYTIC PROCESS

Sam B. Becker, Chicago, Ill., assignor to Standard Oil Company, Chicago, Ill., a corporation of Indiana Application January 31, 1941, Serial No. 376,755

6 Claims. (Cl. 196—52)

This invention relates to a process and apparatus for treating vapors with powdered catalysts and more particularly for treating the vapors of hydrocarbon oils with finely divided, solid catalysts.

One object of the invention is to improve the cracking of heavy hydrocarbon oils by the action of finely divided catalysts and particularly to increase the amount of gasoline produced therefrom at the expense of less desirable products such as carbon and fixed gases. Another object of the invention is to provide an apparatus for treating gases and vapors with powdered suspended catalysts in a continuous system and obtain a more flexible control of the time of contacting catalyst with the vapors than has heretofore been possible. Other objects of the invention will become apparent from the following description thereof.

In the conversion of hydrocarbon oils into gasoline by the action of powdered catalyst it has heretofore been the practice to vaporize the oils and disperse the catalyst in the vapors. The dispersion, which may commonly contain from 1 to 10 parts of catalyst per part of oil by weight was then introduced into a reaction coil or chamber from which it was withdrawn to a catalyst separator. The vapors were then fractionated to recover the gasoline. In the operation of this system, it has been substantially impossible to alter the time of contact between the catalyst and the vapors (catalyst residence time) except by seriously interfering with the capacity of the equipment for processing oil. In conversion of oils, especially by catalysts, there are many variables which enter the operation. It is generally desirable to fix certain of these where possible, and experience has shown that the operation is facilitated by fixing the feed rate or throughput, thereby setting a constant duty for the heater and other equipment, power and water requirements, etc. Having established the capacity or throughput, however, an urgent need arises for a suitable means of regulating performance or extent of conversion which will allow the operator to compensate for other variables or trends beyond his control which creep into the system. Such variables are changes in the susceptibility of the charging oil to conversion and changes in the activity of the catalyst from one time to another.

I have now devised a solution for this problem by employing a special design of reactor which permits operating the process with greater flexibility than has heretofore been obtainable. Briefly, it consists of apparatus and method for varying the time of exposure of catalyst to oil (catalyst residence time) in a suspended catalyst reactor, while the operation is in progress. This is accomplished by using a multiple chamber reactor with upflow and altering the flow through the chambers from series to parallel or various combinations of series and parallel to give the desired result.

My invention is illustrated by a drawing which shows schematically a plant for carrying out the process.

Referring to the drawing, hydrocarbon oil which may be gas oil or heavy naphtha, is charged by line 10 to heater 11 where it is vaporized and heated to a high conversion temperature of the order of 850° F. to 1100° F. The vapors are conducted by transfer line 12 to reactor 13. Before entering the reactor, powdered catalyst from standpipe 14 is introduced through automatic control valve 15 and dispersed in the oil vapors flowing through line 12. The amount of catalyst employed will ordinarily be about 2 to 5 parts by weight per part of oil treated.

Reactor 13 preferably consists of a tower divided into sections as indicated, each section being connected in series to the next by crossover lines 16. When starting up the plant, all the valves in lines 16 may be open and vapors may pass directly through all the reaction zones in series leaving the reactor by line 17. After the reactor has reached the desired temperature for operation the flow through the separate reaction zones is changed. The general method of operation is to pass the vapors and catalyst through the first two or three zones in series and through the latter zones in parallel. This is accomplished by suitable setting of the valves in manifolds 19 and 20. These valves are numbered 21 to 36 as indicated. In one example the vapors may be passed through the first two zones of reactor 13 in series and through the remaining three zones in parallel. This may be accomplished by closing valve 37, and valves 21, 22, 26, 31 and 34. Valves 29, 32 and 35 are open and valves 30, 33 and 36 are controlled to pass an equal proportion of the vapor and catalyst mixture into each of the upper sections of reactor 13. The vapors passing through these sections leave the reactor by valves 23, 24 and 24a and are led by line 17 to catalyst separator 38 where the catalyst is separated from the hydrocarbon vapors and the treated vapors are conducted by vapor line 39 to fractionator 40. Fuel oil, such as recycle gas oil, or furnace oil is withdrawn by line 41 and gasoline vapor is conducted by line 42 to condenser 43 and receiver 44. Gasoline is withdrawn by line 45 and fixed gases are removed by line 46. The fixed gases so eliminated consist largely of methane and ethane, propane and butane with their unsaturated homologs.

Catalyst separated in cyclone separator 38 is passed by line 47 to regenerator chamber 48 where it is regenerated by controlled combustion with air or other oxygen-containing gas, preferably a mixture of air and flue gas containing about 2 to 10% of oxygen. A moderate pressure, say 2 to 10 pounds per square inch, may be maintained in separator 38 to assist in moving the catalyst through the regenerator. Combustion in 48 is regulated to prevent the temperature exceeding a point where the catalyst is permanently injured. Alumina-silica catalysts in general may be regenerated at temperatures up to 1200° F. or even 1400° F. Natural products, such as acid treated clays, bentonite, bauxite, etc., are more sensitive to heat, in general, and require lower regeneration temperatures of the order of 900° F. to 1100° F. Other catalysts which may be used for the conversion of hydrocarbon oils are activated magnesia and magnesia-silica mixtures in which a small amount of magnesia, i. e., 5 to 25% of calcined magnesite, is intimately associated with active silica.

Oxidizing gas for regeneration may be introduced at 49. The regenerated catalyst passes by line 50 to separator 51 where the catalyst is recovered and flows by gravity to standpipe 14 hereinbefore mentioned. The standpipe is a high tower substantially filled with catalyst and employed for the purpose of subjecting the catalyst to sufficient pressure to force it through the system with the oil vapors. Tower 14 may be quite high, of the order of 100 feet, more or less. The pressure resulting from the hydrostatic head of catalyst in this tower may be of the order of 10 to 30 pounds per square inch. Spent regeneration gases are exhausted by line 52.

If desired to operate the first three reactor sections in series, it will be observed that this may be readily accomplished by opening valves 25, 27, 28, 30 and 31 and closing valves 37, 21, 22, 23, 26 and 29. Valves 32 and 35 are open and the parallel flow of hydrocarbons through the last two sections of the reactor is regulated by valves 33 and 36.

In a similar manner the vapors may pass through the first section of the reactor and then be distributed in parallel through the remaining four sections. The relative vapor velocities obtained with this arrangement are about 4 to 1 in the first and in later sections. Likewise additional sections may be provided in the reactor for increasing the flexibility still further. For example, 8 to 12 sections may be readily employed.

If desired, parallel flow may be maintained through all sections of the reactor by opening valve 37 and valves 21, 22, 23 and 24, 26, 29, 32 and 35. Valves 25, 28, 31 and 34 are closed and the distribution of the vapors among the reactor sections is accomplished by regulating valves 53, 27, 30, 33 and 36. Various metering devices may be employed for obtaining uniform distribution of vapors in the reactor sections when operating in parallel. However, it is generally sufficient to simply regulate the opening of the valves and obtain the desired adjustment by observation of the temperatures of the products leaving the different sections.

One advantage of my method of operating the powdered catalyst cracking system results from the combination of series flow at relatively high velocity in the first part of the reactor and parallel flow at lower velocities in the second part of the reactor. In an upflow reactor of this kind, an important factor in determining the catalyst contact time or catalyst residence time is the tendency of the catalyst to sediment or settle in the reactor. As a result, the concentration of the catalyst in the reaction zones is considerably greater than the concentration in transfer line 12 where the catalyst is introduced. Thus, if catalyst is introduced in the charging stock in the ratio of two parts of catalyst per part of oil charged, the concentration of catalyst in the series flow reaction zones may be of the order of 3 to 8 parts of catalyst per part of oil present by weight and in the parallel flow reaction zones, about 20 to 60 parts. Obtaining longer residence times and higher concentrations in this manner is a great advantage in obtaining more complete utilization of the activity of the catalyst before regeneration.

Catalyst residence time, which is the average elapsed time the catalyst is in the reactor, may be divided into two parts, the time in the series flow section and the time in the parallel flow section. In the series flow section the catalyst residence time may be about 10 to 75 seconds, 30 seconds being a fair average, depending on the number of sections of the reactor employed in series flow and other factors. In the parallel flow section, the catalyst residence time may be about 2 to 6 minutes or even longer, for example, 10 minutes, largely as a result of higher catalyst concentration resulting, in turn, from decreased velocity and increased hindered sedimentation of catalyst. The term "hindered sedimentation" is employed to mean a sedimentation or settling to the extent of increased catalyst concentration but without actual separation of catalyst from vapors.

I have found that in the case of freshly regenerated catalysts, there are certain disadvantages resulting from long catalyst residence times, the principal one being an increased production of carbon by the fresh catalyst and a shift in the product distribution toward the production of products of lower molecular weight, mainly the fixed gases and particularly butane.

Thus, the amount of excess butane produced at 40% conversion of heavy oil to gasoline may amount to as much as 6 to 8% when making gasoline having a Reid vapor pressure of 10 pounds. By the use of my process employing a high velocity in the first reaction zone and low velocity in subsequent reaction zones, excess butane may be reduced to about 2 to 4%. This phenomenon may be explained by the formation of a uniform film of adsorbed carbon on the catalyst at elevated temperature in the short time during which the catalyst is passing through the first reaction zone or zones in series. The catalyst being uniformly pretreated in this way then effects the major part of the hydrocarbon conversion in the later reaction zones where the catalyst residence time is anywhere from 5 to 25 times as long, more or less.

In typical example of the operation of my process, gas oil vapors from heater 11 are passed into the first reaction zone in reactor 13, at a pressure of about 20 pounds per square inch and a temperature of 950° F. to 975° F. The catalyst consisting of acid treated bentonite clay powder (80–400 mesh) is introduced into the vapors at a rate of 3 pounds of catalyst per pound of oil treated. The vapor velocity in the first reaction zone is sufficiently great that there is practically no concentration of catalyst therein due to sedimentation. A vapor velocity of 12 feet per second is satisfactory. The catalyst and oil vapors are distributed equally among the remaining four reaction zones, leaving these zones by lines 22, 23, 24 and 17. The vapor velocity in the remaining zones is, therefore, approximately ¼ of the velocity in the first reaction zone, disregarding increase in velocity due to cracking. Sedimentation of catalyst, accordingly, takes place in the later reaction zones, thereby increasing the concentration of catalyst therein. A dense phase of catalyst suspended in vapor results in which the concentration of catalyst may be 10 to 15 pounds per cubic foot of vapor equivalent to about 40 to 60 pounds of catalyst per pound of oil treated. As a result of this concentrating effect, due to sedimentation, the catalyst remains in the reactor a much longer time than would be the case if it passed straight through the reactor with all reaction zones connected in series, in which case the catalyst to oil ratio would be only about that at which it is fed in, say 3 pounds per pound of oil.

In the later reaction zones, the temperature is somewhat lower than in the initial reaction zone. For example, it may be about 900° F to 925° F. Under the conditions described above, about 45% of the oil charged is converted into gasoline having a Reid vapor pressure of 10 pounds, an end point of 400° F. on distillation and a knock rating of about 81 octane number, A. S. T. M.

One of the advantages of my new conversion apparatus resides in the fact that the conditions of reaction may be varied and adjusted during operation without interfering with either feed rate or catalyst-oil ratio. In the operation of a large scale process of this kind, it is not easy to obtain a balance between the feed rate, the rate of heat input, the catalyst rate, catalyst regeneration and numerous other important factors. When such a balance is obtained usually after several hours or days of operation, it is naturally very undesirable to change any of the factors involved because doing so throws out of balance all the other factors and a new balance must then be established. When the process is not in balance a serious loss in efficiency results.

It sometimes happens that changes in catalyst activity occurring in the operation of the process, changes in the character of feed stock, or changes in the specification of the products require different distribution of hydrocarbons, for example, such as would be necessary in shifting from the manufacture of motor gasoline to aviation gasoline requiring a change in the reaction conditions and more particularly a change in the catalyst residence time. With my improved apparatus, the catalyst residence time may be varied, at will, over a relatively wide range during the operation of the process without interfering with any of the other controls. This is accomplished mainly by a resetting of the valves in manifolds 19 and 20 and shifting the reaction zones more or less from series to parallel flow or vice versa. The advantages of this unique method of control are obvious.

Although I have described my invention with respect to a specific embodiment thereof, I intend that it be limited only by the following claims. I have described certain adaptations of the invention but I do not intend that it be limited thereby. Thus I include various modifications such as effecting catalytic conversion in the presence of hydrogen and/or hydrocarbon gases separated from the products and recycled, thereby increasing catalyst life and activity. Other modifications will be apparent to those skilled in the art.

I claim:

1. The method of converting hydrocarbon oils by contacting at high temperature with powdered catalysts, comprising vaporizing a hydrocarbon oil in a continuous stream, dispersing a powdered, solid catalyst in the resulting oil vapors, conducting the dispersion of oil vapors and catalyst through an elongated reaction zone wherein an initial conversion reaction occurs at relatively low catalyst concentration, thence conducting the said dispersion of oil vapors and catalyst upwardly through a plurality of similar, vertically disposed, elongated reaction zones in parallel, thereby reducing the vapor velocity of said dispersion in said parallel reaction zones and effecting an increase in the concentration of the catalyst by hindered sedimentation therein, conducting the reaction products and catalyst to a separating zone, therein separating catalyst from reaction products.

2. The method of claim 1 wherein the temperature of said reaction zones is maintained within the range of about 850° F. to 1100° F.

3. The method of claim 1 wherein said separated catalyst is regenerated by controlled oxidation with air and the regenerated catalyst is recycled in the system.

4. The method of converting hydrocarbon oils by contacting them with suspended catalyst in upflowing reaction zones where hindered settling of catalyst occurs comprising conducting a dispersion of catalyst and hydrocarbon vapors in an upflowing stream at conversion temperature through a plurality of reaction zones, thereafter separating catalyst from vapors and recovering the desired hydrocarbon products and regulating the velocity of said vapors and dispersed catalyst within said reaction zones and thereby the catalyst residence time by directing the flow through said reaction zones from series to parallel when desiring to increase the catalyst residence time and from parallel to series when desiring to decrease the catalyst residence time substantially as desired without interrupting the flow of vapors and catalyst in the process.

5. The method of converting hydrocarbon oils by contacting them with suspended catalyst in upflowing reaction zones where hindered settling of catalyst occurs comprising conducting a dispersion of catalyst and hydrocarbon vapors in an upflowing stream at conversion temperature through a plurality of reaction zones in series, thereafter separating catalyst from vapors and recovering the desired hydrocarbon products and during the operation, increasing the catalyst residence time in said reaction zones by changing the flow through at least two of said reaction zones from series to parallel, thereby reducing the vapor velocity in said zones and increasing the catalyst concentration therein as a result of increased hindered settling, substantially without interrupting the flow of vapors and catalyst in the process.

6. The method of converting hydrocarbon oils by contacting them with suspended catalyst in upflowing reaction zones where hindered settling of catalyst occurs comprising conducting a dispersion of catalyst and hydrocarbon vapors in an upflowing stream at conversion temperature through a plurality of reaction zones, the flow through at least two of said reaction zones being in parallel, thereafter separating catalyst from vapors and recovering the desired hydrocarbon products, and during the operation, decreasing the catalyst residence time in said reaction zones by changing the flow through at least two of said reaction zones from parallel to series, thereby increasing the vapor velocity in said zones and reducing the catalyst concentration therein as a result of decreased hindered settling, substantially without interrupting the flow of vapors and catalyst in the process.

SAM B. BECKER.